(12) United States Patent
Rossanese et al.

(10) Patent No.: US 7,534,102 B2
(45) Date of Patent: May 19, 2009

(54) APPARATUS AND A METHOD FOR INJECTION-COMPRESSION MOLDING OF ARTICLES MADE OF PLASTIC MATERIAL WITH TWO COMPONENTS

(75) Inventors: Afro Rossanese, Noventa di Piave (IT); Dario Girelli, Brescia (IT)

(73) Assignee: INGLASS S.p.A., San Polo Di Piave (Treviso) (IT)

( * ) Notice: Subject to any disclaimer, the term of this patent is extended or adjusted under 35 U.S.C. 154(b) by 770 days.

(21) Appl. No.: 11/047,106

(22) Filed: Jan. 31, 2005

(65) Prior Publication Data

US 2006/0108702 A1    May 25, 2006

(30) Foreign Application Priority Data

Nov. 19, 2004  (IT)  ............ TO2004A0813

(51) Int. Cl.
*B29C 45/80*   (2006.01)
(52) U.S. Cl. ............ 425/138; 100/99; 425/150; 425/169
(58) Field of Classification Search ............ 425/150, 425/169, 138; 100/46, 99, 258 A
See application file for complete search history.

(56) References Cited

U.S. PATENT DOCUMENTS 5,853,773 A * 12/1998 Choi ............ 425/150

6,171,092 B1 * 1/2001 Galt et al. ............ 425/150

FOREIGN PATENT DOCUMENTS

DE        10217584     * 11/2002

OTHER PUBLICATIONS

U.S. Appl. No. 11/047,480, filed Jan. 31, 2005, Rossanese et al.
U.S. Appl. No. 11/047,500, filed Jan. 31, 2005, Rossanese et al.
U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,104, filed Jan. 31, 2005, Rossanese et al.
U.S. Appl. No. 11/047,481, filed Jan. 31, 2005, Rossanese et al.
U.S. Appl. No. 11/046,937, filed Jan. 31, 2005, Rossanese et al.

* cited by examiner

*Primary Examiner*—Tim Heitbrink
(74) *Attorney, Agent, or Firm*—Heslin Rothenberg Farley & Mesiti P.C.; Victor A. Cardona, Esq.

(57) ABSTRACT

An apparatus and a process for the molding of articles made of plastic material with two components by means of a stack-mold press with a first cavity and a second cavity for the injection of the plastic material and the possible compression of the injected plastic material, in which the moulds and the countermolds of the apparatus define respective mutually facing surfaces. Parameters indicating the mutual parallelism between said facing surfaces are detected, and the closing assembly for closing the press is controlled according to the parameters detected.

4 Claims, 1 Drawing Sheet

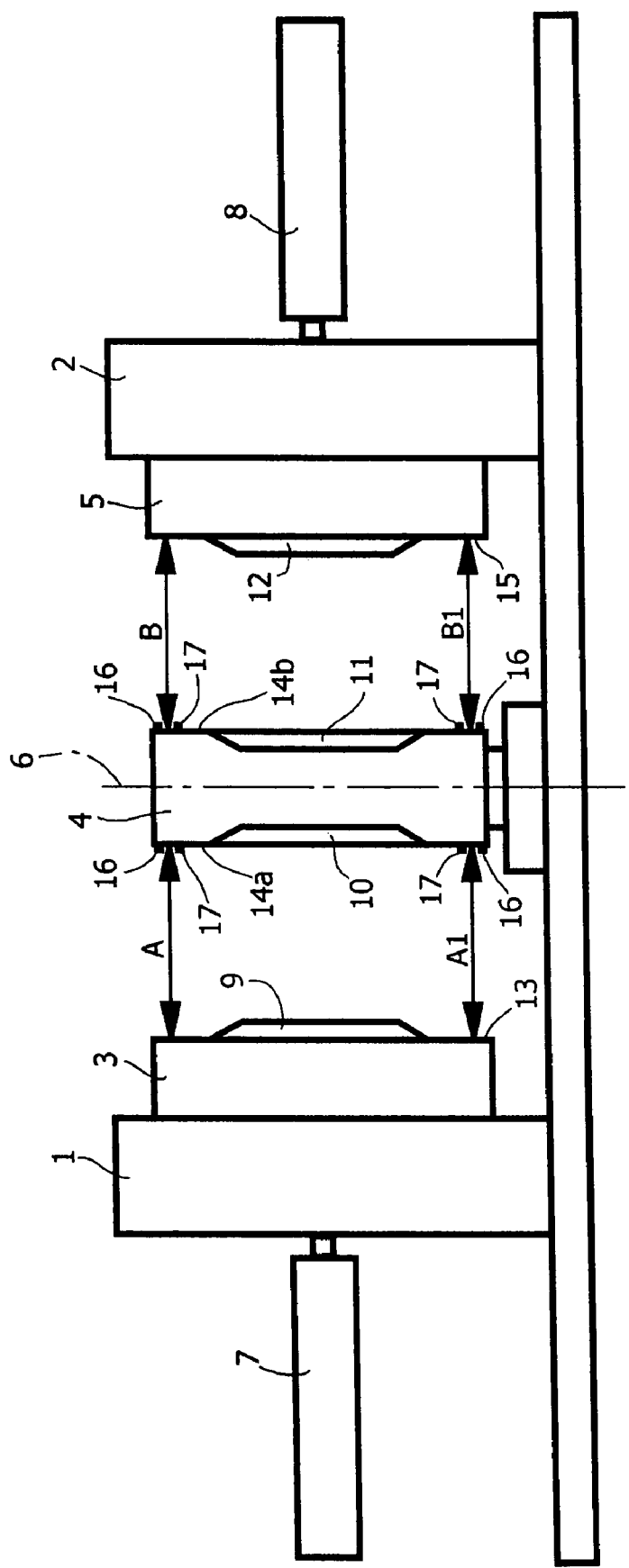

APPARATUS AND A METHOD FOR INJECTION-COMPRESSION MOLDING OF ARTICLES MADE OF PLASTIC MATERIAL WITH TWO COMPONENTS

CROSS-REFERENCE TO RELATED APPLICATIONS

This application claims priority from Italian application number TO2004A000813, filed on Nov. 19, 2004, the entire disclosure of which is incorporated herein by reference.

This application also relates to U.S. patent application Ser. No. 11/047,480, filed on Jan. 31, 2005, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,500, filed on Jan. 31, 2005, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed on Jan. 31, 2005, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on Jan. 31, 2005, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,104, filed Jan. 31, 2005, and titled "PROCESS FOR THE PRODUCTION OF PLATES MADE OF PLASTIC MATERIAL WITH PARTS OVERMOULDED BY INJECTION-COMPRESSION," the contents of which are incorporated herein by reference.

This application also relates to U.S. patent application Ser. No. 11/047,481, filed Jan. 31, 2005, and titled "A METHOD FOR THE PRODUCTION OF PLATES MADE OF PLASTIC MATERIAL WITH PARTS OVERMOULDED BY INJECTION COMPRESSION," the contents of which are incorporated herein by reference.

This application also relates to U.S. patent application Ser. No. 11/046,937, filed on Jan. 31, 2005, and titled "AN APPARATUS AND A PROCESS FOR THE INJECTO-COMPRESSION MOULDING OF ARTICLES MADE OF PLASTIC MATERIAL WITH TWO COMPONENTS," the contents of which are incorporated herein by reference.

FIELD OF THE INVENTION

The present invention relates to the moulding of articles made of moulded plastic material with two components, in two successive steps.

STATE OF THE PRIOR ART

More in particular, the invention relates to an apparatus which can be associated to a press of the type comprising: a rotating central element, which bears a first mould and a second mould set opposite to one another; a first countermould and a second countermould, which are set on opposite sides with respect to the rotating central element and can be translated with respect thereto; means for closing said first and second countermoulds with respect to said first and second moulds to define respective moulding cavities; means for injection of a plastic material within said first and second cavities; and means of compression of the plastic material in at least one of said first and second cavities, respectively, for the moulding of said first component and the overmoulding of said second component.

Moulding presses of the above sort are conventionally called "stack-mould presses" and are used for the moulding of items with two components, including even complex ones, in two successive steps. First, the first component is moulded using the first mould and the first countermould; then, by means of a rotation through 180° of the rotating central element, the first mould is located in a position corresponding to the second countermould for overmoulding of the second component on the first component. Simultaneously, using the second mould and the first countermould, the first component of a subsequent article is formed, and the cycle is then repeated in an identical way.

The products that can be made with such moulding apparatuses can be of various natures and types: the first component may, for example, consist of a transparent plate, even one of large dimensions, typically made of polycarbonate, and the second component can be constituted by a perimetral frame made of a different plastic material, for example a non-transparent one, formed with appendages and attachments for assembly of the product on a supporting structure, for instance the body of a motor vehicle.

The attached figure is a schematic illustration, in side elevation, of a press of the stack-mould type, to which the present invention refers. It comprises, in brief, a pair of press surfaces 1, 2, to which respective screw-type injection assemblies 7, 8 are associated and which are set on opposite sides with respect to a central element 4 rotating about a vertical axis 6. The press surfaces 1, 2 bear, via respective plates 3, 5, two countermoulds 9, 12 facing respective moulds 10, 11, carried by the rotating central element 4. The press is equipped with a hydraulic closing system, not illustrated in so far as it is of a conventional kind, through which the press surfaces 1, 2 and hence the plates 3, 5 with the countermoulds 9, 12 are closed on opposite sides against the rotating central element 4 so as to define two moulding cavities, within which, via the assemblies 7 and 8, the plastic material is injected in the fluid state. In this way, in the cavity defined between the countermould 9 and the mould 10 there is, for example, formed the first component of the article to be moulded, whilst in the cavity defined between the countermould 12 and the mould 11 the second component is overmoulded on the first component previously formed. The transfer of the first component from the position corresponding to the countermould 9 towards the position corresponding to the countermould 12 is obtained, as already explained, as a result of the rotation through 180° of the central element 4 about the axis 6. The final piece formed by the two components is finally unloaded from the press.

A stack-mould press of this type is described, for example, in the document No. DE-A-10217584.

This system thus enables management of the injection of the two components, which are to constitute the finished article with the closing system itself.

In the case of pieces of large dimensions, or in any case ones of high quality, there is posed the problem of guaranteeing the necessary quality of the moulded items in terms of absence of deformations due to warping and maintenance of the best mechanical characteristics. This applies particularly to the case of large plates made of transparent plastic material, for which it is necessary to prevent the presence of residual stresses that would impair the optical characteristics thereof. For this reason, precisely for the purpose of improving the characteristics of the items produced, a technique of injection-compression is used, consisting in the performance of a step of compression following upon the step of injection of the plastic material within the mould, or simultaneously with said injection step. Said technique, which can be applied to the moulding of the first or of the second component, or else, of both, enables a considerable reduction of the residual stresses in the material injected within the cavities of the mould to be obtained.

These methodologies, together with specific peculiar solutions, are described and illustrated, for example, in the Italian patent applications Nos. TO2004A000696 and TO2004A000697, both of which filed on Oct. 8, 2004 in the name of the present applicant and both of which still unpublished at the date of filing of the present application.

The process of injection-compression, obtained on both or even just one of the components of articles made of plastic material with two components, however, involves some critical problems basically deriving from the fact that closing between the vertical surfaces (designated by 13 and 15 in the figure) of the plates 3, 5 bearing the two countermoulds 9 and 12 and the vertical surfaces facing them (designated in the figure by 14a and 14b) of the central element 4, which bears the moulds 10 and 11, is obtained, during the steps of injection and possible compression, by the hydraulic closing assembly, which acts only upon the external surfaces (as has been said, designated by 13 and 15 in the figure). Typically, the closing assembly includes horizontal guide columns (not illustrated in the Figure) set substantially adjacent to the vertices of the press surfaces 1 and 2.

Control of the relative positions of the facing surfaces 13, 14a and 15 and 14b is thus delegated to the control of position of said columns. This involves a problem of tolerances, since the system has numerous intermediate elastic elements belonging to the press and to the mould, which have a negative effect on the possibilities of measurement and hence of precise intervention. To be able to carry out injection-compression with the necessary precision it is necessary for the surfaces of the one or more moulds and countermoulds between which the compression is performed to be brought up parallel to one another. The approximate control of this parallelism in fact generates an error that has a negative effect on the distribution of the material, since the closing system of the press tends to close first the area of the mould with less pressure, i.e., the one more distant from the injection which is still either totally or partially empty. If the thickness is not constant, an error is generated which, after rotation of the mould, given the same parameters, is amplified: in fact, by closing the moulded item in the second cavity, an additional force is generated, which tends to increase the misalignment and hence the error.

In traditional stack-mould presses, the correct control of parallelism is in effect practically impossible. The problem of this lack of control generates lack of uniformity of thickness in the moulded components and, hence, undesirable effects from every point of view: internal stresses, deformations, dimensional tolerances, aesthetic appearance, etc.

A further problem connected to the methodology of injection-compression using presses of the stack-mould type relates to the dosage of the plastic material. The injection-compression envisages having to dose the material exactly: it is necessary to close the injection system generally prior to the step of compression. In this way, since the final volume of the moulding cavity is exactly defined, all the errors of dosing of the material within the cavity generate undesirable effects at the end of the compression, and subsequently also burrs or the impossibility of completing closing of the cavity. Instead, lack of material generates incompleteness of the piece. It is hence necessary, during the moulding step to keep under control in an accurate way the various parameters so that the mould arrives exactly in the desired closing position with the desired pressure. The final thickness must be carefully calibrated directly by the mould, and the step of compression must be carried out in a parallel way to distribute the material within the cavity in the best possible way so as to prevent adverse effects on the internal stresses of the moulded piece ("in-mould stresses") and hence on its deformations and mechanical and also optical characteristics, in the case of transparent items.

The aforesaid problems arise both in the case where the injection-compression is envisaged only for the first component of the article and in the case where both of the components are moulded by means of injection-compression. Obviously, in the second case the problems of misalignment and the lack of control of elements belonging to the mould are even more critical.

SUMMARY OF THE INVENTION

The purpose of the present invention is to solve the problems mentioned above.

According to a first aspect of the invention, said purpose is achieved via an apparatus for the moulding of articles made of plastic material with two components of the type defined at the start, in which said moulds and said countermoulds define respective facing surfaces, the essential characteristic of which lies in the fact that it comprises sensor means operatively associated to said facing surfaces for measuring parameters indicating the mutual parallelism between said surfaces and for controlling said closing means according to the parameters measured.

Said sensor means can include position transducers for measuring the distance directly between said surfaces during closing of said countermoulds with respect to the respective moulds, and/or pressure transducers for direct measurement of the pressures that are exerted between said facing surfaces in the terminal step of closing of said countermoulds with respect to the respective moulds.

According to another aspect, the invention envisages a process for the moulding of articles made of plastic material with two components by means of an apparatus of the type defined at the start, characterized in that it further comprises the step of measuring parameters indicating the mutual parallelism between said facing surfaces, and the step of controlling said closing means according to the parameters measured.

DETAILED DESCRIPTION OF THE INVENTION

The invention will now be described in detail with reference to the annexed drawing, which is provided purely by way of non-limiting example and is a schematic and simplified view in elevation of a press of the stack-mould type according to the invention.

With reference to the figure, the stack-mould press according to the invention differs from a conventional press (the essential components of which have already been described previously) on account of the presence of a system for measuring the parallelism between the surfaces 14a, 14b corresponding to the moulds 10 and 11, and the facing surfaces 13 and 15, respectively, corresponding to the countermoulds 9 and 12.

The aforesaid measurement system can comprise position or displacement transducers 16, for example, prearranged on the central element 4, i.e., on the moulds 10, 11 in a position corresponding to the vertices of the surfaces (normally quadrangular) 14a and 14b, designed to measure the distances A, A1 and B, B1, in a direct way. The position transducers 16 are of a conventional type, and their details will not be described for reasons of brevity in so far as they are within the reach of a person skilled in the branch.

There may moreover be provided, as an alternative or in combination with the position transducers 16, sensors for the direct measurement of the pressures that are exerted, in the terminal step and/or at the end of the stroke of compression, between the facing surfaces 14a, 13 and 14b, 15. These transducers, designated by 17 and constituted, for example, by load cells, may also be provided on the central element 4, i.e., on the moulds 10, 11, in positions close to those of the position transducers 16.

The position transducers 16 and/or the pressure transducers 17 may be positioned in different areas, even not necessarily on the central element 4 and, for example, on purposely provided supports.

The position transducers 16 and/or the pressure transducers 17 are operatively connected, through an electronic control system with which the press is normally equipped, and via appropriate algorithms, to the hydraulic closing assembly of the press itself so that the forces and speeds of the closing cylinders will be regulated so as to guarantee correct execution of the moulding process. The direct measurement of the distance between the surfaces 14a, 13 and 14b, 15, between which the step of compression is performed enables in fact a regular process to be obtained. The final check that the surfaces have come into contact on all the sides and that a regular closing pressure is developed then enables an accurate check to be carried out on the effective amount of plastic material present in the one and/or in the other moulding cavity, i.e., to enable a control of the quality of the piece produced.

Of course, the conformation and arrangement of the sensors 16 and 17 may vary with respect to what is described with reference to the example. It should moreover be noted that it is also possible to envisage only the presence of the position transducers 16 or else only the presence of the pressure transducers 17, and that in any case said transducers may be associated only to one of the moulding cavities, in the case where the step of compression of the injected plastic material is envisaged only for said cavity.

In the case of production of high-quality bi-component items, such as for example transparent plates of large dimensions with non-transparent perimetral frame, in which the moulding by means of injection-compression is performed for both of the components, the system will be preferably complete, in the sense that there will be conveniently used both the position transducers 16 and the pressure transducers 17. In this case, the best results for the purposes of the final quality of the articles moulded may be obtained by combining the system for measuring the parallelism according to the invention with the retention devices that form the subject of the already cited Italian patent application No. TO2004A000697 and with the contrast devices that forms the subject of the already cited Italian patent application No. TO2004A000697.

Of course, the details of construction and the embodiments may vary widely with respect to what is described and illustrated herein, without thereby departing from the scope of the present invention, as defined by the ensuing claims.

The invention claimed is:

1. An apparatus for the moulding of articles made of plastic material with two components comprising:
a rotating central element, which bears a first mould and a second mould set opposite to one another;
a first countermould and a second countermould, which are set on opposite sides with respect to the rotating central element and can be translated with respect thereto;
means for closing said first and second countermoulds with respect to said first and second moulds to define respective moulding cavities;
means for injection of a plastic material within said first and second cavities;
means for compression of the plastic material in at least one of said first and second cavities, respectively, for the moulding of said first component and the overmoulding of said second component, in which said moulds and said countermoulds define respective facing surfaces; and
sensor means located on said facing surfaces for measuring parameters indicating the mutual parallelism between said facing surfaces and for controlling said closing means according to the parameters measured.

2. The apparatus according to claim 1, wherein said sensor means include position transducers for measuring the distance directly between said facing surfaces during closing of said countermoulds with respect to the respective moulds.

3. The apparatus according to claim 2, wherein said sensor means include pressure transducers for direct detection of the pressures that are exerted between said facing surfaces in the terminal step of closing of said countermoulds with respect to the respective moulds.

4. The apparatus according to claim 1, wherein said sensor means are provided on said moulds.

* * * * *